Jan. 27, 1931.  C. G. STRANDLUND  1,790,331
CULTIVATOR
Filed Nov. 25, 1927  4 Sheets-Sheet 1

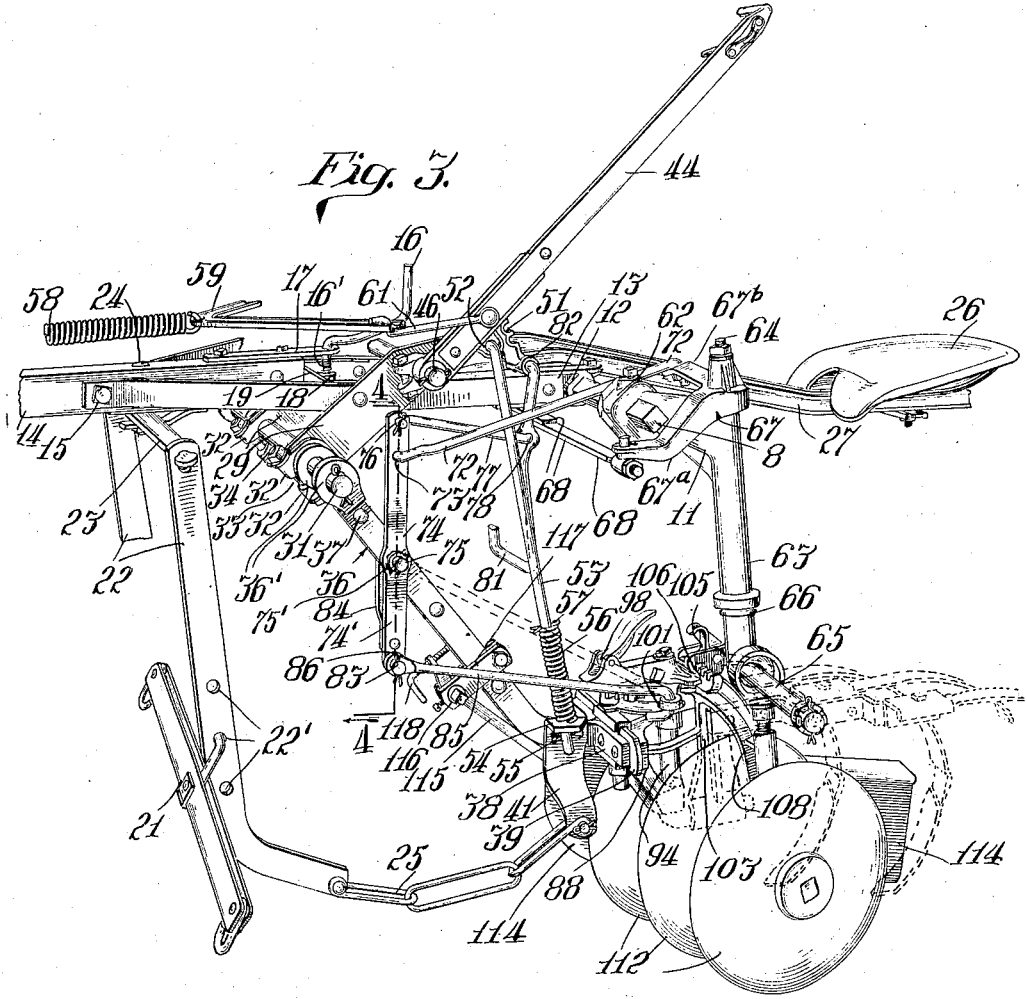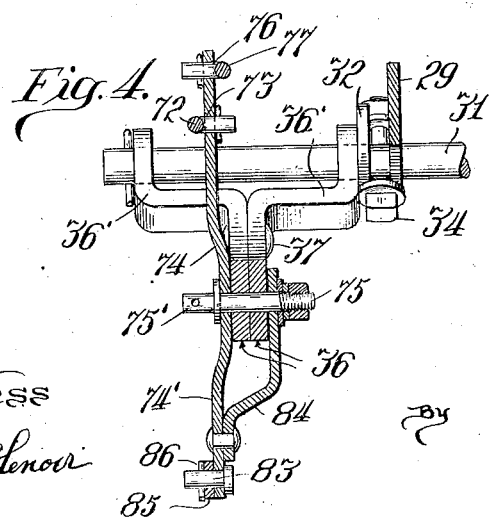

Jan. 27, 1931.  C. G. STRANDLUND  1,790,331
CULTIVATOR
Filed Nov 25, 1927  4 Sheets-Sheet 4
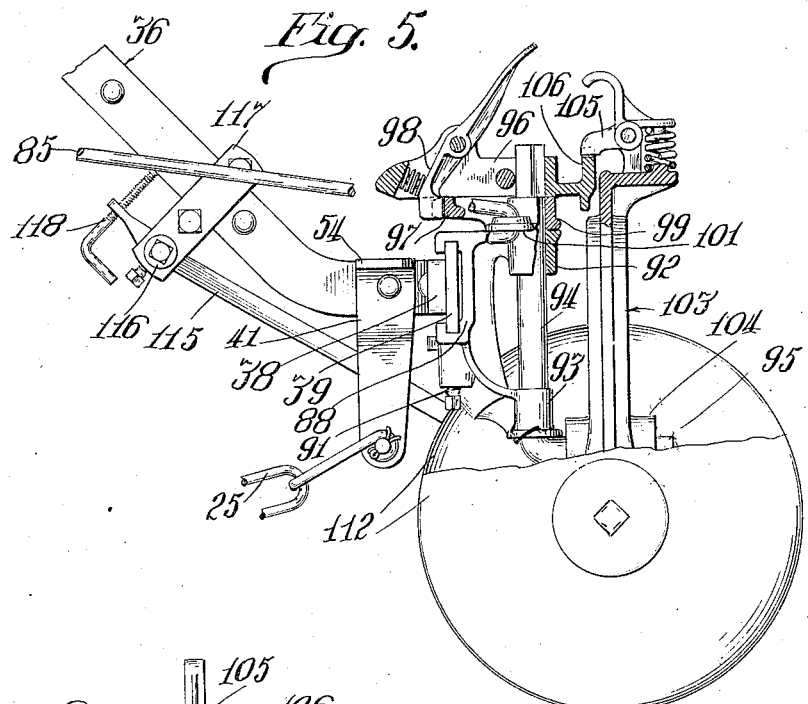
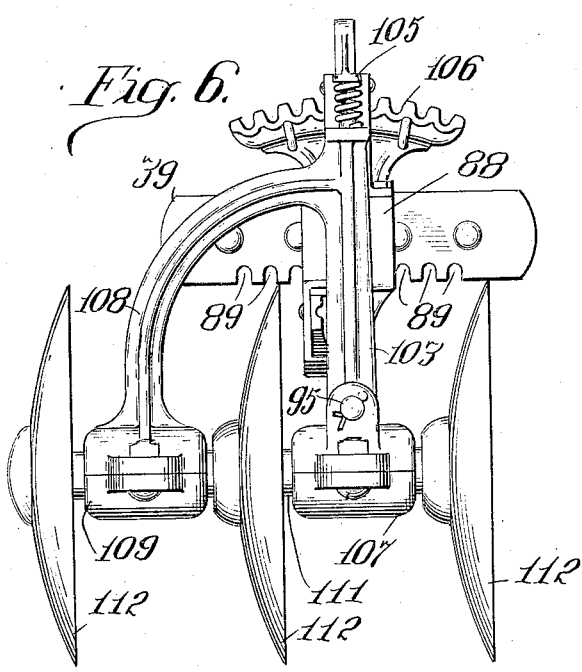
Inventor.
Carl G. Strandlund
John L. Jackson
Attorney
Witness
Milton Lenoir
By Patented Jan. 27, 1931

1,790,331

UNITED STATES PATENT OFFICE

CARL G. STRANDLUND, OF MOLINE, ILLINOIS, ASSIGNOR TO DEERE & COMPANY, OF MOLINE, ILLINOIS, A CORPORATION OF ILLINOIS

CULTIVATOR

Application filed November 25, 1927. Serial No. 235,415.

The present invention relates generally to cultivating implements, and particularly to cultivators of the "pivoted wheel" type wherein the steering of the cultivator in following deviations in the plant row is accomplished by angling movement of the wheels relatively to the frame.

The principal object of the invention is to provide a pivoted wheel type of cultivator which can employ disks as the cultivating elements, and more specifically in this regard to provide means for swinging the cultivating disks with the angling movements of the wheels, so that the disks will maintain their proper angle to the line of advance while the cultivator is being steered sideways. By thus angling the cultivating disks with the angling movements of the wheels, the tendency of the disks to resist steering by digging into the soil and by dragging over the surface thereof is avoided; furthermore the disks are made to actually aid in steering; and the disks are also maintained at their most effective cultivating angle even when weaving sharply from side to side in following a plant row. The present improvements make practicable the use of disk cultivating gangs on this pivoted wheel type of cultivator, which heretofore has been objectionable if not impracticable, owing to the resistance opposed by such gangs to the steering of such implement. Other more specific objects and advantages of the invention will appear in the following description of a preferred embodiment thereof. In the drawings accompanying this description Fig. 1 is a fragmentary plan view of a cultivator embodying my invention.

Fig. 3 is a perspective view of one side of the implement frame, the adjacent supporting wheel being removed to illustrate to better advantage the adjacent cultivating rig.

Fig. 4 is a detail sectional view taken approximately on the plane of the line 4—4 of Fig. 3.

Fig. 5 is a fragmentary side view, partly in section, showing the mounting of the disk gang on the cultivating rig, and Fig. 6 illustrates the mounting as viewed from the rear.

Figure 2:
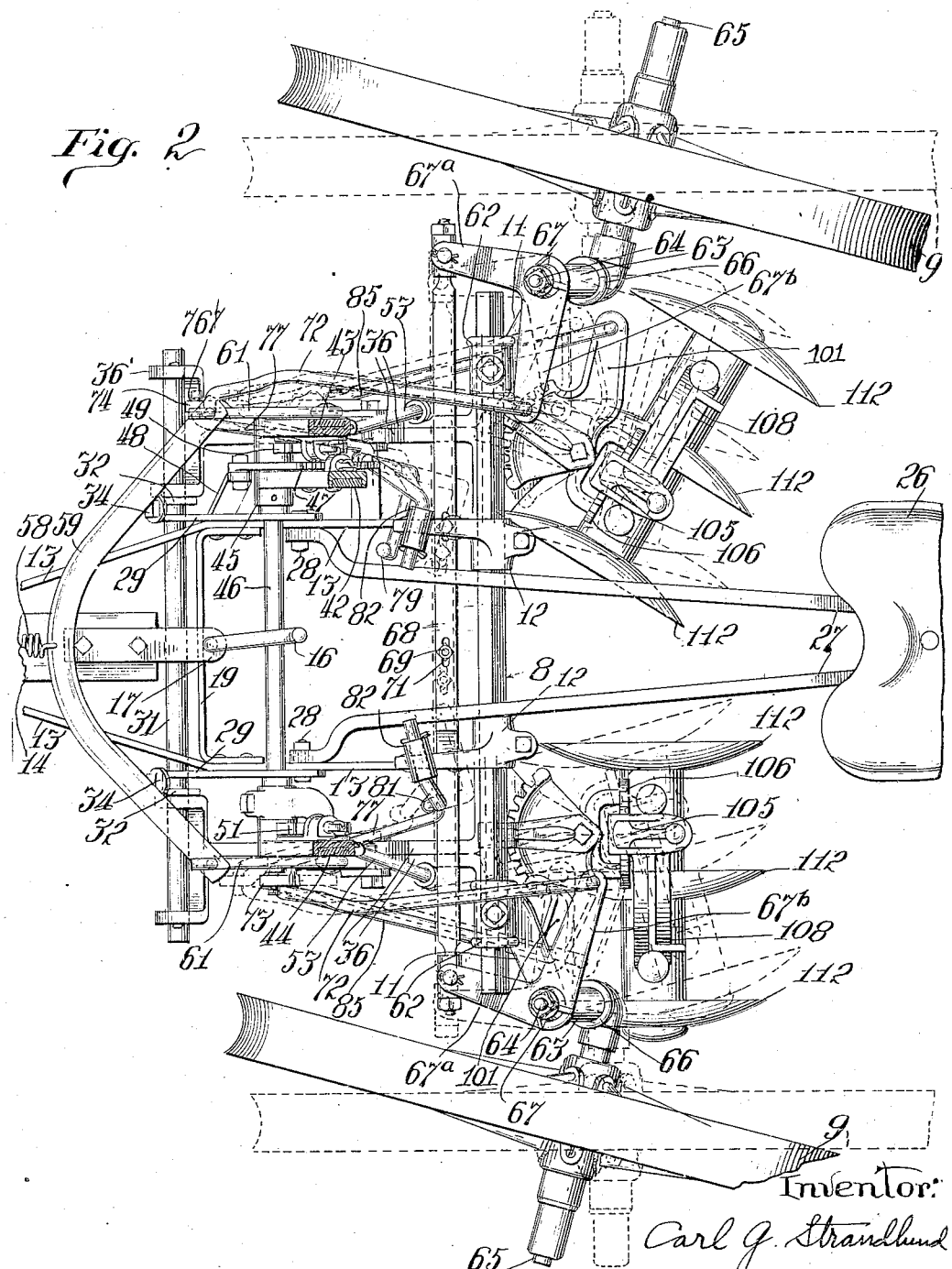
Fig. 2 is a similar view on a slightly larger scale, illustrating a steering position of the parts in full lines, and the straight line travel position in dotted lines.

The frame, comprises a transverse beam or bar 8, preferably of square cross section, which forms the main supporting element of the frame. The two supporting wheels 9 are pivoted for horizontal steering movement in brackets 11, which are secured to the outer ends of the frame bar 8, as will hereinafter appear. Secured to the intermediate portion of the frame bar 8 are clamping sleeves or brackets 12, to which are secured forwardly extending frame bars 13 which converge at their forward ends for attachment to the sides of the draft pole 14. The pole is adapted to have limited tilting adjustment about a bolt 15 which connects the frame bars 13 thereto, such tilting adjustment being effected by a pole tilting crank 16, which is rotatably supported in a strap 17 extending from the rear end of the pole (Fig. 3). The lower threaded end 16' of the crank screws into a suitable nut 18 carried by a cross strap or yoke 19, which is secured between the frame bars 13. Draft is transmitted to the implement through single trees 21, which are linked to draft pendants 22 constructed in the form of L-shaped bars (Fig. 3). The upper ends of these draft pendants are pivotally connected to the ends of an evener bar 23, which is pivotally connected to the under side of the draft pole 14 on a bolt 24. Draft chains 25 are linked to the lower ends of the pendants 22 and have linked connection with the cultivator rigs in a manner which I shall presently describe. The single trees 21 may be coupled to different holes 22' in the pendants for obtaining different heights of draft hitch. The operator's seat 26 is supported on the rear ends of two seat bars or arms 27—27 which are bolted at their forward ends at 28 to the inner sides of the frame bars 13, said seat bars extending across the top of the main frame beam 8 and resting thereon.

Rigidly secured to the outer sides of the frame bars 13 are plates 29 which extend downwardly and forwardly, as shown in Figure 3, and which support a transversely extending shaft 31 at their forward ends. The plates or brackets 29 have their ends folded backwardly to provide the U-shaped portions 32, which are slotted in an upward and rearward direction, as indicated at 33. The shaft 31 passes through alined openings in the opposite sides of these U-shaped portions, and a clamping bolt 34 (Fig. 4) passes through the looped end of each U-shaped portion on the under side of the shaft 31 for drawing the U-shaped portions 32 into rigid clamping engagement with the shaft 31. Pivotally supported on each end of the shaft 31, outside of the bracket plate 29, is a rig supporting beam or bar 36. As best shown in Figure 4, each beam or bar 36 consists of two duplicate bars which have their forward ends spread apart as indicated at 36′ for providing two widely spaced points of bearing support of the bar on the shaft 31. The intermediate portions of the duplicate bars extending down to the cultivator rig are riveted together as indicated at 37. The lower ends of the two bars making up the rig beam 36 are bent outwardly as indicated at 38 and are rigidly secured to a transverse bar or plate 39 forming a mounting head for the cultivator rig. Rigidly secured to the outer side of each rig beam 36 is a bracket 41 to which the draft links 25 are coupled, whereby the draft pull is transmitted through the bracket 41 to the rig head 39 for pulling each cultivator rig forwardly. The two cultivating rigs, which I shall presently describe in detail, are thus supported as independent units on the lower ends of their beams 36, so that the rigs can be swung upwardly and downwardly by pivotal movement of the beams around the shaft 31.

The mechanism for raising and lowering the rigs comprises a master lever 42 (see Fig. 2), and two independent levers 43 and 44 for independently actuating each rig. The master lever 42 has its hub portion 45 fixedly secured to a transversely extending shaft 46 which has bearing support in the upwardly extending portions of the bracket plates 29. Said master lever comprises the usual latch mechanism which has latching engagement with a stationary sector 47 secured by brackets 48 to the frame bar 13 at the right hand side of the implement. Fixedly secured to the end portions of the shaft 46 are latching sectors 49 and 51, with which the independent shakeout levers 43 and 44 cooperate, the latter having the usual latch mechanism for engaging with these sectors. Referring to Figure 3, these independent levers are pivotally mounted on the outer ends of the shaft 46 and have lugs 52 extending rearwardly therefrom, with which rods 53 are pivotally connected. The lower end of each rod 53 passes downwardly through an apertured lug 54 extending laterally from the bracket 41, and carries a stop pin 55 adapted to engage the under side of such lug for limiting the downward movement of the rig relative to the rod 53. A compression spring 56 is interposed between the top of the lug 54 and a pin 57 carried by the rod 53, whereby such spring normally tends to force the cultivating rig downwardly into the ground, or until the stop pin 55 engages the under side of the lug 54. It will be understood that the linked connection between the shakeout lever 43 and the rig at the other side of the machine is substantially a duplication of the construction shown in Figure 3. Actuation of the master lever 42 causes corresponding movement of the two independent levers 43 and 44 by virtue of their latched engagement with the sectors 49 and 51, and hence the two cultivating rigs are caused to swing upwardly and downwardly with this actuating movement of the master lever. Independent adjustment of each rig is effected by actuation of the independent lever 43—44 associated with such rig, which enables the rig to be raised or lowered without rotating the shaft 46. The weight of the rigs is counterbalanced by a tension spring 58 which is suitably connected at its forward end to the draft pole 14, and which is connected at its rear end to the center of a U-shaped equalizing bar 59. The ends of such bar have connection through links 61 with the independent levers 43 and 44, whereby the tension of the spring 58 is effective on said levers for counterbalancing the weight of the cultivator rigs.

Referring now to the mechanism for steering the wheels 9 and for simultaneously steering the cultivating disks, it will be seen from Figure 3 that each bracket 11 has a horizontal sleeve portion 62 which is clamped to the outer end of the main frame bar 8, the bracket 11 being shiftable along the frame bar for fastening thereto at different points, so that the tread spacing between the wheels can be adjusted when desired. Each bracket 11 also comprises a downwardly extending sleeve 63 in which the vertical portion 64 of a wheel axle 65 is journaled. Each wheel 9 is rotatably supported on the horizontally extending spindle portion of the axle 65, and the upwardly extending portion of this axle is rotatable in the sleeve 63 so that the wheels 9 can be angled relative to the frame, as indicated in Fig. 2. A collar 66 on the axle 65 bears against the lower end of the sleeve 63 and carries the weight of the implement bearing downwardly on the axle. Fixedly secured to the projecting upper end of each axle, above the top of the sleeve 63, is a bell crank lever 67. Pivotally connected to the forwardly extending arm 67a of each bell crank lever is a cross bar 68. As shown in Figure 2, the two cross bars 68 extending inwardly from each bell crank lever are connected together at the center of the implement by bolts 69 which extend down through slots 71 formed in the overlapping portions of the bars 68. This slotted connection permits the effective length of the two bars to be increased or diminished to accommodate the inward or outward shifting of the wheels 9 in obtaining different tread spacings of the wheels.

The inwardly extending arms 67b of the two bell crank levers have pivotal connection with rods 72 which extend forwardly and have pivotal connection at 73 to the upper portions of levers 74. These levers are pivotally mounted on bolts or pins 75 which extend through the rig beams 36. Pivotally connected at 76 to the upper ends of the levers 74 are links 77 which extend rearwardly for effecting pivotal connection at 78 with the intermediate portions of depending foot pedals 79—81. Such pedals are disposed at opposite sides of the implement for right and left hand steering, the pedal 79 at the right side of the implement appearing in Figs. 1 and 2. The upper ends of such pedals are pivotally supported in brackets 82 which are secured to the upper edges of the forwardly extending frame bars 13. It will be evident that by merely pushing forwardly on either pedal the operator can cause the two wheels 9—9 to swing in a corresponding direction relative to the frame, so that he can quickly and easily steer the implement to one side or the other in following lateral deviations in the plant row. Such forward thrusting movement exerted on either pedal operates through the link 77, lever 74 and link 72, to transmit swinging movement to the arm 67b of the adjacent bell crank lever 67, and the movement of one bell crank lever 67 is transmitted to the other through the transverse steering link 68 so that both wheels swivel or angle together in their steering movement. From the foregoing it will be seen that the above described mechanism comprising the links 77, upper portions of the levers 74, links 72, bell crank levers 67 and the cross connecting link 68 constitutes wheel steering means for directly and positively angling the wheels 9 through actuation of the pedal 79, 81. It will be observed that steering movement of the two wheels in either direction will result in the upper end of the lever 74 at one side of the implement moving forwardly, and the upper end of the corresponding lever at the other side of the implement moving rearwardly. Swinging movement of these levers is employed to transmit angling movement to the two disk gangs, in directions corresponding to the angling movements of the wheels, through disk angling means which I shall now describe.

Each lever 74 has a lower arm 74′ extending downwardly from the pivot pin 75, which lower arm carries a pivot pin 83 at its end. Referring to Fig. 4, the pivotal mounting of each lever 74 on its rig beam 36 is reinforced by a bar or plate 84 which is secured at its lower end to the lower portion of the lever and which has pivotal support on the pin 75 at the opposite side of the beam 36, thus giving a two point bearing support for the lever 74. A link 85 normally has pivotal mounting on the extending end of the pivot pin 83, being releasably held thereon by a cotter pin 86 passing through the pin 83. Attention is directed at this point to the fact that the fulcrum pivot 75 has a laterally projecting end 75′ which is also adapted to receive the end of the link 85. The transposition of the link 85 from the pivot pin 83 to the fulcrum pivot 75 is made when it is not desired to transmit angling movement to the cultivating tools, concurrently with the steering of the wheels 9, as will hereinafter appear.

Each cultivating gang is supported on the lower end of its individual rig beam 36, with the two gangs spaced laterally from each other, as shown in Fig. 1, to engage in the soil on opposite sides of the plant row, such being the customary mounting of these cultivator gangs. A plurality of adjusting devices are usually interposed between the rig beam 36 and the cultivating gang so as to permit the gang to be displaced inwardly or outwardly from the center of the cultivator for wide or narrow rows; so as to permit the gang to be swiveled about a substantially vertical axis to change the cutting angle of the discs relative to the line of advance of the implement; and so as to permit each gang to be swiveled about a substantially horizontal axis for inclining the gangs for more effective cultivation on a hilled or furrowed crop. These several adjustments in and of themselves form no part of the present invention, being disclosed in prior Patent No. 1,251,096 to Wesley A. Paul. However, in order clearly to understand the angling of the gangs with the angling of the wheels 9, such adjustments will be briefly described.

It will only be necessary to describe one of the rigs and its cultivating gang, as the rigs and gangs are duplicated on the opposite sides of the implement. Referring to Figs. 5 and 6, the bar or plate 39 functions as a relatively stationary guide, along which slides a bracket 88, the latter having hook-like flanges which embrace the upper and lower edges of the plate 39. The shiftability of the bracket 88 along the plate 39 affords the transverse shifting adjustment referred to above, whereby the cultivator gang can be displaced inwardly or outwardly from the center of the cultivator. As shown in Fig. 6, the lower edge of the plate 39 is provided with spaced teeth or notches 89, with which cooperates a rotatable shifting and locking member 91, which is journaled in the bracket 88 below the plate 39. The upper end of the member 91 has a spiral tooth which engages in the teeth 89, and which, upon rotation of the member 91, causes the bracket 88 to shift along the plate 39.

Projecting rearwardly from the upper and lower ends of the bracket 88 are bearing arms 92 and 93 in which is journaled the vertical portion of a spindle 94. The lower end of this spindle extends rearwardly, as indicated at 95, to form a substantially horizontal pivotal axis around which the gang can be rocked, as will be presently described. Secured to the upper end of the spindle 94 is a bracket 96 which swings with the spindle in the rotative movement of the latter in the bearing arms 92, 93. The front end of this bracket swings over the arcuate edge of a notched segment 97, such bracket having a spring pressed dog 98 pivotally mounted therein and normally engaging in the teeth of the segment for locking the bracket 96 thereto. The hub 99 of the segment 97 is rotatably mounted on the spindle 94, preferably between the upper bearing arm 92 and the bracket 96. An arm or crank 101 extends outwardly from this hub, as best shown in Figs. 1 and 2, and the rear end of the link 85 has pivotal connection with an eye in the end of such arm or crank. It will be evident that when the link 85 is held stationary, the segment 97 will also be held stationary. When it is desired to give the cultivating gang an angular adjustment so as to change the cutting angle of the discs or other tools relative to the line of advance of the implement, the dog 98 is released from the segment 97 and the bracket 96 is swung to one side or the other, depending upon the desired cutting angle. This results in the spindle 94 rotating in the upper and lower bearing arms 92, 93 for swiveling the gang around the substantially vertical axis of the spindle. Upon re-engagement of the dog 98 in the segment 97 the gang will be retained at the predetermined cutting angle with respect to segment 97. When the wheels 9, 9 are angled in steering the implement, the motion transmitting mechanism previously described results in the link 85 being either drawn forwardly or thrust rearwardly, and such movement of the link causes the segment to swing about the axis of the spindle 94. Owing to the latched engagement of the bracket 96 to the segment 97, the rotation of such segment will cause corresponding angling movement to be transmitted to the cultivator gang, simultaneously with the angling of the wheels 9. Thus it will be seen that the lower portions 74' of the levers 74, together with the links 85 and the arms 101, constitute disk angling means operating concurrently with the previously described wheel angling means, both of these angling or steering means being actuated by common operating means in the form of the pedals 79, 81.

The cultivating gang is mounted on a transversely swinging arm 103 which has a hub 104 at its lower end journaled on the rearwardly extending porton 95 of the spindle 94. The upper end of such arm carries a spring pressed dog 105 which is adapted to engage selectively in the teeth of a latching segment 106 which is formed as a rearward extension of the bracket 96. It will be evident that by releasing the dog 105, the arm 103 can be swung about the substantially horizontal pivotal axis 95 for inclining the gang in either direction, as for adapting the implement to the cultivation of a hilled or furrowed crop. Referring to Fig. 6, it will be noted that the lower end of the arm has a bearing hub 107, and that such arm also has a laterally extending yoke portion 108, the lower end of which also carries a hub 109. The shaft or spindle 111, on which the disks 112 are mounted, extends through both of these hubs 107 and 109. When it is desired to substitute shovel or spring tooth gangs for the disk gangs, the member 103 is removed in its entirety from the pivotal mounting 95, and another type of arm is substituted therefor, which latter arm is specially constructed for supporting shovel or spring tooth gangs, such as are illustrated in dotted lines in Fig. 3. It is frequently desirable to employ fenders or shields 114 which are disposed on the inner sides of the cultivating gangs and which prevent the plants from being covered by the soil turned inwardly by the gangs. Each fender is supported on its individual rig beam through an arm 115 which has pivotal mounting at 116 in a bracket 117 clamped to the rig beam 36. Any suitable adjusting means 118 may have cooperative engagement with the upper end of the arm 115 and with the beam 36 for holding the fender 114 in its proper position.

In summarizing the operation of the implement, it will be evident from the foregoing that when the operator wishes to steer the implement to the right or to the left in following deviations in the plant row, he presses forwardly on the corresponding pedal 79 or 81. Fig. 2 illustrates the implement being steered to the right, and it will, therefore, be assumed that the pedal 79 at the right side of the implement has been actuated. This movement of such pedal is transmitted through the link 77, lever 74 and link 72 at the right side of the implement to the bell crank lever 67 associated with the right hand wheel 9. The resultant movement of such wheel will also cause corresponding movement of the left hand wheel through the cross links 68, as previously described. Such movement of the wheels will also cause the lever 74 at the left side of the machine to be actuated through the link 72. The lower end of the link 74 at the right side of the machine, in moving rearwardly, will operate through the link 85 to swing the corresponding segment arm 101 rearwardly, which will cause the disk gang at the right side of the machine to be turned through an angle corresponding approximately to the turning angle of the wheels. Similarly, the forward movement of the lower end of the lever 74 at the left side of the implement will pull forwardly on the link 85 and will cause the corresponding segment arm 101 on this side of the implement to be swung forwardly for turning the corresponding disk gang through the same angle. Thus the disks of both gangs will be shifted so that they will follow the lateral travel of the implement, while still maintaining their proper angle to the line of advance for most efficient cultivation. Such angling of the disk gangs prevents the gangs from being dragged sideways across the soil, which heretofore has made the maneuvering of these implements when equipped with disk gangs very difficult, owing to the tendency of the disks at one side of the implement to dig into the soil, and the disks at the other side of the implement to drag transversely across the top of the soil. When the wheels 9 are returned to their normal positions in parallelism with the implement frame, the disk gangs are, of course, restored to their previous positions through reverse operation of the parts. It will be understood that this angling operation will occur with the gangs in any angular setting, and with the gangs arranged either for throwing the soil inwardly toward the plant row or outwardly away from the same. Furthermore, by virtue of the pivotal mounting of each lever 74 on the rig beam 36, the cultivating rigs can be raised and lowered to obtain different depth adjustments without interfering with this angling movement of the gangs; and the motion transmitting linkage between the wheels and the gangs does not in any way interfere with the lifting of the gangs to transport position. It will also be understood that each gang can also be shifted transversely, or can be rocked about the vertical and horizontal pivot axes 94 and 95 in securing the adjustments above described, without any interference from the swiveling linkage.

When using shovel or spring tooth gangs it is not of such advantage to angle the gangs with the wheels, since these gangs do not oppose the steering movement of the cultivator to any great extent. Accordingly, at such times it may be desirable to place the motion transmitting linkage in an inoperative condition so that the gangs will not be angled or swiveled with the wheels. This is accomplished by disconnecting each link 85 from the lower pivot pin 83, and connecting the same to the extending ends of the upper fulcrum pivots 75, as indicated in dotted lines in Fig. 3. The links can be releasably held on the end portions 75' of these pivots by cotter pins inserted through holes in the end portions 75'. With each link 85 in such position, the levers 74 can rock backwardly or forwardly incident to steering movement of the wheels, without transmitting movement to the cultivating gangs. With the links thus connected to the fulcrum pivots 75, the latching segments 97 are held stationary with reference to the rig beams, so that the gangs remain in their predetermined angular positions with reference to the axes of their spindles 94.

While I have described what I consider to be a preferred embodiment of my invention, I wish it to be understood that this embodiment is merely exemplary, and that numerous modifications and rearrangements of parts may be made without departing from the essence of the invention.

What I claim as my invention and desire to secure by Letters Patent is:

1. In a cultivator, the combination of a frame, a pair of wheels supporting said frame, means for angling said wheels relatively to said frame for steering said cultivator, a cultivating rig carried by said frame for vertical pivotal movement, said rig being held against lateral movement relatively to said frame, a cultivating disk carried by said rig, and means for angling said disk relatively to said frame with the angling of said wheels.

2. In a cultivator, the combination of a frame, a pair of wheels supporting said frame, means for angling said wheels relatively to said frame for steering said cultivator, a disk cultivating rig mounted on said frame to move vertically, the vertical movement of said rig being restricted to a single vertical plane relatively to said frame, and means for angling the disks of said rig relatively to said frame with the angling movement of said wheels.

3. In a cultivator, the combination of a frame, a pair of wheels supporting said frame, means for angling said wheels relatively to said frame for steering said cultivator, a cultivating rig mounted on said frame to move into and out of operative position, said rig being held against lateral swinging movement relatively to said frame, a disk gang adjustably mounted on said rig, and means for angling the disks of said gang relatively to said frame with the angling movement of said wheels.

4. In a cultivator, the combination of a frame, a pair of wheels supporting said frame, means for angling said wheels relatively to said frame for steering said cultivator, a disk cultivating rig pivotally mounted on said frame for different depth adjustments, said rig being permanently held against lateral swinging movement relative to said frame, and means for transmitting angling movement from said wheels to the disks on said rig irrespective of the depth adjustment of said rig.

5. In a cultivator, the combination of a frame, a pair of wheels supporting said frame, means for angling said wheels relatively to said frame for steering said cultivator, a cultivating rig movably mounted on said frame, a cultivating gang carried by said rig, and motion transmitting means functioning in its operative condition to transmit angling movement to said cultivating gang with the angling movement of said wheels, said motion transmitting means being capable of being placed in inoperative condition to permit angling movement of said wheels independent of angling movement of said cultivating gang.

6. In a cultivator, the combination of a frame, a pair of wheels supporting said frame, means for angling said wheels relatively to said frame for steering said cultivator, a cultivating rig movably mounted on said frame and adapted to support a cultivating gang, and motion transmitting means functioning in its operative condition to transmit angling movement to said gang with the angling movement of said wheels, said motion transmitting means being capable of being placed in inoperative condition to permit angling movement of said wheels while holding said cultivating gang against angling movement.

7. In a cultivator, the combination of a frame, a pair of wheels supporting said frame, means for angling said wheels relatively to said frame for steering said cultivator, a cultivating rig pivotally supported on said frame to swing into and out of operative position, draft means connected to transmit draft directly to said rig, a disk gang adjustably supported on said rig to permit the cutting angle of said disks to be adjusted relatively to said frame, and means for changing the cutting angle of said disks relatively to said frame simultaneously with the steering of said wheels.

8. In a cultivator, the combination of a frame, a pair of wheels supporting said frame, means for angling said wheels relatively to said frame for steering said cultivator, a cultivating rig pivotally supported on said frame to swing vertically, a disk gang, means supporting said disk gang on said rig whereby said gang can be adjusted about substantially vertical and horizontal axes relatively to said rig, and means for angling said gang relatively to said frame corresponding with the steering movement of said wheels.

9. In a cultivator, the combination of a frame, a pair of wheels supporting said frame, means for angling said wheels relatively to said frame for steering said cultivator, a cultivating rig pivotally supported on said frame to swing vertically, a disk gang carried by said rig, a lever pivoted to said rig, and means connecting said lever with the wheel steering means and with said disk gang whereby said gang is caused to swing correspondingly with the steering movement of said wheels.

10. In a cultivator, the combination of a frame, a pair of wheels supporting said frame, means for angling said wheels relatively to said frame for steering the cultivator, a pair of disk gangs supported on said frame, a master depth adjusting lever connected to raise and lower both gangs simultaneously, independent depth adjusting levers for each of said gangs and means for angling said gangs with the steering movement of said wheels.

11. In a cultivator, the combination of a frame, a pair of wheels supporting said frame, means for angling said wheels relatively to said frame for steering the cultivator, a pair of rig beams pivotally mounted on said frame, disk gangs carried by said rig beams, and motion transmitting mechanism comprising levers mounted on said rig beams and operatively connected with said wheel angling means and with said disk gangs for causing said disk gangs to swing correspondingly with the steering movement of said wheels.

12. In a cultivator, the combination of a frame, a pair of wheels supporting said frame, means for angling said wheels relatively to said frame for steering the cultivator, a pair of rig beams pivotally mounted on said frame, disk gangs pivotally supported on said rig beams for horizontal swinging movement, levers pivotally mounted on said rig beams, link mechanism operatively connecting said levers with said wheel steering means, and link mechanism operatively connecting said levers with said disk gangs to cause the latter to swing with the steering movement of said wheels.

13. In a cultivator, the combination of a frame, a pair of wheels supporting said frame, means for angling said wheels relatively to said frame for steering the cultivator, a pair of rig beams pivotally mounted on said frame, adjusting levers operatively connected to raise and lower said beams, disk gangs for each of said beams, means adjustably supporting said gangs on said beams so as to permit of different angular adjustments of said gangs, and motion transmitting mechanism comprising levers pivotally mounted on said beams and operatively connected with said wheel angling means and with said disk gangs for causing said gangs to swing correspondingly with the steering movement of said wheels.

14. In a cultivator, the combination of a frame, a pair of wheels supporting said frame, means for angling said wheels relatively to said frame for steering the cultivator, a pair of rig beams pivotally mounted on said frame, adjusting levers operatively connected to raise and lower said beams, disk gangs for each of said beams, means adjustably supporting said gangs on said beams so as to permit of translational and angular adjustments of said gangs relatively to said beams, levers pivotally mounted on said beams, means operatively connecting said latter levers with said wheel steering means, and means operatively connecting said levers with said disk gangs to cause the latter to swing correspondingly with the steering movement of said wheels.

15. In a cultivator, the combination of a frame, a pair of axle members mounted on said frame to swing about substantially vertical axes, wheels on said axle members, levers connected to said axle members, steering pedals mounted on said frame, cooperating linkage connecting said pedals with said levers to cause angling movement of said wheels for steering the cultivator, a pair of rig beams pivotally mounted on said frame, means for raising and lowering said rig beams independently, disk gangs for each of said rig beams, means adjustably supporting said gangs on said beams so as to permit of translational and angular adjustments of said gangs relatively to said beams, levers pivotally mounted on said beams, means operatively connecting said latter levers with said pedals, and means operatively connecting said latter levers with said disk gangs to cause the latter to angle correspondingly with the steering movement of said wheels.

16. In a cultivator, the combination of a frame, a pair of wheels supporting said frame and mounted to swing about substantially vertical axes, steering means for swinging said wheels, a pair of cultivator rigs movably mounted on said frame, a disk gang pivotally supported on each cultivator rig for horizontal swinging movement, a pair of cooperating latch members for normally holding each gang at a predetermined cutting angle, and means operatively connecting said steering means with one of the latch members of each gang for causing said gangs to swing horizontally with the steering movement of said wheels.

17. In a cultivator, the combination of a frame, a pair of wheels supporting said frame and mounted to swing about substantially vertical axes, steering means for swinging said wheels, a pair of cultivator rigs movably mounted on said frame, a disk gang pivotally supported on each cultivator rig for horizontal swinging movement, and mechanism for automatically causing said gangs to swing horizontally with the steering movement of said wheels, said mechanism comprising means adapted to be placed selectively in different positions either for transmitting swinging movement to said gangs or for holding said gangs against automatic swinging movement.

18. In a cultivator, the combination of a frame, a pair of wheels supporting said frame, means for angling said wheels relatively to said frame for steering said cultivator, a pair of rig beams, pivot means connecting the front ends of said beams with said frame, disk gangs supported on the rear portions of said beams, means for angling said disk gangs relatively to said frame with the angling movement of said wheels, said latter means comprising motion transmitting members mounted on said rig beams, and draft means connected with said rig beams intermediate said front pivot means and said disk gangs.

19. In a cultivator, the combination of a frame, a pair of wheels supporting said frame, means for angling said wheels relatively to said frame for steering said cultivator, two laterally spaced substantially vertical pivots, means supporting said pivots on said frame for vertical swinging movement but holding the same against lateral swinging movement, cultivating disks mounted on said pivots for lateral swinging movement, and means for angling said disks with the steering movement of said wheels.

20. In a cultivator, the combination of a frame, a pair of wheels supporting said frame, means for angling said wheels relatively to said frame for steering the cultivator, a pair of rig beams pivotally connected adjacent to their forward ends with said frame, cultivating devices connected with the rear portions of said rig beams, a master depth adjusting lever connected to raise and lower both rig beams simultaneously, independent depth adjusting levers for raising and lowering each of said rig beams independently of the other, and means for angling said cultivating devices relatively to said frame correspondingly with the steering movement of said wheels.

21. In a cultivator, the combination of a frame, a pair of wheels supporting said frame, a pair of cultivator rig beams pivotally supported on said frame to swing vertically, disk gangs carried by said rig beams, levers pivotally mounted on said rig beams, steering devices operatively connected with said levers, mechanism for transmitting motion from said levers to said wheels for angling said wheels relatively to the frame for steering the cultivator, and mechanism for transmitting motion from said levers to said disk gangs for causing the latter to swing correspondingly with the steering movement of said wheels.

22. In a cultivator, the combination of a frame, a pair of wheels supporting said frame, a pair of rig beams pivotally mounted on said frame to swing vertically, cultivating devices carried by said beams, levers pivotally mounted on said rig beams, steering devices operatively connected with said levers, and mechanism for transmitting motion from said levers to said wheels for angling said wheels relatively to the frame for steering the cultivator.

23. In a cultivator, the combination of a frame, a pair of wheels supporting said frame, a pair of rig beams, means pivotally connecting the forward ends of said beams with said frame for permitting vertical swinging movement thereof but holding said beams against lateral swinging movement, disk gangs pivotally supported on the rear ends of said beams for lateral swinging movement relatively thereto, draft means operatively connected with said rig beams intermediate the front and rear ends thereof, depth adjusting levers operatively connected to raise and lower said beams, motion transmitting levers pivotally supported on said beams intermediate the ends thereof on substantially horizontal pivot axes, steering devices operatively connected with said latter levers, operating connections between said motion transmitting levers and said wheels for angling said wheels relatively to said frame for steering the cultivator, and operating connections between said motion transmitting levers and said disk gangs for causing said gangs to swing relatively to said beams correspondingly with the steering movement of said wheels.

24. In a cultivator, the combination of a frame, a pair of wheels supporting said frame, means for angling said wheels relatively to said frame for steering said cultivator, a rig beam pivotally supported on said frame, a cultivating device movably supported on said rig beam, a motion transmitting lever, a pivot member mounting said lever on said rig beam, said lever being operatively connected with said wheel angling means to be actuated thereby, and a link operatively connected with said cultivating device, said link being adapted for connection with a swinging portion of said lever for transmitting angling movement to said cultivating device with the angling of said wheels, said link being disconnectible from the swinging portion of said lever and adapted for connection with said pivot member to permit angling movement of said wheels while holding said cultivating device against angling movement.

25. In a cultivator, the combination of a frame, a pair of wheels supporting said frame, means for angling said wheels relatively to said frame for steering said cultivator, a supporting member for supporting a cultivating device, a lever fulcrumed on the cultivator, means operatively connecting said lever with said wheel angling means, a link operatively connected at one end with the cultivating device and adapted to have its other end connected with a swinging portion of said lever for angling said cultivating device with the angling of said wheels, the latter end of said link being disconnectible from the swinging portion of said lever, and means for supporting the latter end of said link, when thus disconnected from the swinging portion of said lever, in substantially fixed relation to the fulcrum axis of said lever.

26. In a cultivator, the combination of a frame, a pair of wheels supporting said frame, means for angling said wheels relatively to said frame for steering the cultivator, a cultivator rig beam, pivot means pivotally supporting said rig beam on said frame for vertical pivotal movement but holding said beam against lateral movement relatively to said frame, a cultivating gang pivotally mounted on said rig beam for lateral angling movement relatively thereto, means for angling said cultivating gang relatively to said rig beam with the angling movement of said wheels, and draft means connected with said rig beam intermediate said pivot means and said cultivating gang.

27. In a cultivator, the combination of a frame, a pair of wheels supporting said frame, means for angling said wheels relatively to said frame for steering said cultivator, a cultivating rig beam movably mounted on said frame for vertical movement, a cultivating gang carried by said rig beam, motion transmitting mechanism adapted to transmit angling movement to said cultivating gang with the angling movement of said wheels, said motion-transmitting mechanism comprising a link operatively connected with said gang, one end of said link being disconnectible from said motion transmitting mechanism when it is desired to permit angling movement of said wheels independently of angling movement of the cultivating gang, and means for connecting the latter end of said link with said cultivating rig beam at such time for holding the gang relatively to the rig beam.

CARL G. STRANDLUND.